United States Patent
Malviya et al.

(10) Patent No.: US 12,032,200 B2
(45) Date of Patent: Jul. 9, 2024

(54) TRENCH ASSISTED MULTI-CORE OPTICAL FIBER WITH REDUCED CROSSTALK

(71) Applicant: Sterlite Technologies Limited, Gurugram (IN)

(72) Inventors: Apeksha Malviya, Gurugram (IN); Srinivas Reddy Munige, Gurugram (IN); Janarthanan Balakrishnan, Gurugram (IN); Shubham, Gurugram (IN); Ranjith Balakrishnan, Gurugram (IN); Anand Pandey, Gurugram (IN)

(73) Assignee: Sterlite Technologies Limited, Harayana (IN)

( * ) Notice: Subject to any disclaimer, the term of this patent is extended or adjusted under 35 U.S.C. 154(b) by 0 days.

(21) Appl. No.: 17/698,832

(22) Filed: Mar. 18, 2022

(65) Prior Publication Data
US 2023/0204849 A1    Jun. 29, 2023

(30) Foreign Application Priority Data
Dec. 28, 2021    (IN) .............................. 202111061222

(51) Int. Cl.
*G02B 6/02*    (2006.01)

(52) U.S. Cl.
CPC ..... *G02B 6/02009* (2013.01); *G02B 6/02042* (2013.01)

(58) Field of Classification Search
None
See application file for complete search history.

(56) References Cited

U.S. PATENT DOCUMENTS

| | | | | |
|---|---|---|---|---|
| 3,593,055 | A * | 7/1971 | Geusic | H05B 33/00 250/552 |
| 6,421,491 | B1 * | 7/2002 | Liu | G02B 6/03666 385/127 |
| 6,430,346 | B1 * | 8/2002 | Conradi | G02B 6/02009 385/123 |

(Continued)

OTHER PUBLICATIONS

Lattice Definition & Meaning—Merriam-Webster online obtained Dec. 15, 2023 at 11:11 p.m. (Year: 2023).*

(Continued)

*Primary Examiner* — Andrew Jordan
(74) *Attorney, Agent, or Firm* — Steven R. Fairchild; Michael J. Pennington (57) ABSTRACT

Disclosed is a multi-core optical fiber having a plurality of cores extending parallelly along a central axis of the multi-core optical fiber. Each core of the plurality of cores is up-doped with an up-dopant. The multi-core optical fiber further has a plurality of buffer layers such that each buffer layer of the plurality of buffer layers envelop a corresponding core of the plurality of cores. Each buffer layer of the plurality of buffer layers has a predefined buffer layer thickness. The multi-core optical fiber further has a plurality of trench layers such that each trench layer of the plurality of trench layers envelops a corresponding buffer layer of the plurality of buffer layers. Each trench layer of the plurality of trench layers is down-doped with a down-dopant. The multi-core optical fiber has an inter-core crosstalk of less than −30 decibel/kilometres (dB/km) at a wavelength of 1550 nanometres (nm).

10 Claims, 2 Drawing Sheets

(56) References Cited

U.S. PATENT DOCUMENTS

| | | | | |
|---|---|---|---|---|
| 7,817,884 B2* | 10/2010 | DeMeritt | G02B 6/02009 | 359/341.1 |
| 7,920,767 B2* | 4/2011 | Fini | G02B 6/03688 | 385/126 |
| 8,041,173 B2* | 10/2011 | Imamura | G02B 6/02338 | 385/125 |
| 8,326,105 B2* | 12/2012 | Imamura | G02B 6/02338 | 385/125 |
| 8,335,421 B2* | 12/2012 | Imamura | G02B 6/02333 | 385/125 |
| 8,406,595 B2* | 3/2013 | Hayashi | G02B 6/02042 | 385/126 |
| 8,457,462 B2* | 6/2013 | Imamura | G02B 6/02338 | 385/126 |
| 8,503,847 B2* | 8/2013 | Kokubun | H04B 10/2581 | 385/126 |
| 8,718,429 B2* | 5/2014 | Hayashi | G02B 6/02042 | 385/126 |
| 8,737,792 B2* | 5/2014 | Fini | G02B 6/02042 | 385/127 |
| 8,737,793 B2* | 5/2014 | Imamura | G02B 6/0365 | 385/126 |
| 8,755,659 B2* | 6/2014 | Imamura | G02B 6/02347 | 398/43 |
| 8,774,625 B2* | 7/2014 | Binkert | G02B 6/356 | 370/254 |
| 8,811,784 B2* | 8/2014 | Mukasa | G02B 6/02333 | 398/142 |
| 8,811,785 B2* | 8/2014 | Hayashi | G02B 6/02266 | 385/124 |
| 8,811,787 B2* | 8/2014 | Feuer | H04J 14/04 | 385/126 |
| 8,965,165 B2* | 2/2015 | Sasaki | G02B 6/02042 | 385/126 |
| 8,971,685 B2* | 3/2015 | Matsuo | G02B 6/0365 | 385/127 |
| 8,983,259 B2* | 3/2015 | Rockwell | G02B 6/02042 | 385/126 |
| 9,008,479 B2* | 4/2015 | Tanigawa | G02B 6/02042 | 385/126 |
| 9,052,432 B2* | 6/2015 | Yao | G02B 6/02042 | |
| 9,081,129 B2* | 7/2015 | Matsuo | G02B 6/02042 | |
| 9,088,364 B1* | 7/2015 | Imamura | G02B 6/02333 | |
| 9,128,233 B2* | 9/2015 | Taru | G02B 6/02042 | |
| 9,128,234 B2* | 9/2015 | Mukasa | H04B 10/2581 | |
| 9,164,228 B2* | 10/2015 | Hayashi | G02B 6/4401 | |
| 9,291,768 B2* | 3/2016 | Ishida | G02B 6/02042 | |
| 9,400,351 B2* | 7/2016 | Takenage | G02B 6/03605 | |
| 9,405,060 B2* | 8/2016 | Ishida | G02B 6/02042 | |
| 9,470,840 B2* | 10/2016 | Ishida | G02B 6/02042 | |
| 9,529,144 B2* | 12/2016 | Ishida | G02B 6/02 | |
| 9,541,704 B2* | 1/2017 | Hayashi | G02B 6/02042 | |
| 9,563,011 B2* | 2/2017 | Li | G02B 6/02009 | |
| 9,588,284 B2* | 3/2017 | Sasaki | G02B 6/02219 | |
| 9,638,867 B2* | 5/2017 | Li | G02B 6/43 | |
| 9,817,183 B2* | 11/2017 | Amma | G02B 6/02042 | |
| 10,101,526 B2* | 10/2018 | Sasaki | G02B 6/02 | |
| 10,310,176 B2* | 6/2019 | Sasaki | G02B 6/03694 | |
| 10,545,283 B2* | 1/2020 | Froggatt | G01D 5/3538 | |
| 10,557,986 B2* | 2/2020 | Munige | G02B 6/0281 | |
| 10,746,921 B2* | 8/2020 | Bian | G02B 6/107 | |
| 10,884,251 B2* | 1/2021 | Karafin | G02B 30/56 | |
| 10,962,351 B2* | 3/2021 | Roye | B25J 9/1694 | |
| 10,983,268 B2* | 4/2021 | Froggatt | G01B 11/161 | |
| 11,119,270 B2* | 9/2021 | Bickham | G02B 6/0365 | |
| 11,156,529 B2* | 10/2021 | Hasegawa | G01M 11/3145 | |
| 11,181,749 B2* | 11/2021 | Karafin | G02B 6/06 | |
| 11,221,670 B2* | 1/2022 | Karafin | G02B 27/1066 | |
| 11,237,307 B2* | 2/2022 | Karafin | G06F 3/011 | |
| 11,280,940 B2* | 3/2022 | Karafin | G02B 3/0056 | |
| 11,327,222 B2* | 5/2022 | Pandey | G02B 6/0281 | |
| 11,480,727 B2* | 10/2022 | Hayashi | G02B 6/028 | |
| 11,506,834 B2* | 11/2022 | Mishra | G02B 6/4403 | |
| 11,604,312 B2* | 3/2023 | Hayashi | G02B 6/02347 | |
| 11,624,870 B2* | 4/2023 | Froggatt | G01D 5/35303 | 385/126 |
| 2002/0141719 A1* | 10/2002 | Liu | G02B 6/02266 | 385/127 |
| 2009/0324242 A1* | 12/2009 | Imamura | G02B 6/02042 | 398/142 |
| 2010/0290750 A1* | 11/2010 | Imamura | G02B 6/02338 | 385/126 |
| 2010/0296784 A1* | 11/2010 | Imamura | G02B 6/02042 | 385/126 |
| 2011/0129190 A1* | 6/2011 | Fini | G02B 6/02042 | 264/1.28 |
| 2011/0176804 A1* | 7/2011 | Blinkert | G02B 6/356 | 370/255 |
| 2011/0182557 A1* | 7/2011 | Hayashi | G02B 6/02042 | 385/127 |
| 2011/0243517 A1* | 10/2011 | Kokubun | G02B 6/02042 | 385/123 |
| 2012/0008908 A1* | 1/2012 | Imamura | G02B 6/02042 | 385/126 |
| 2012/0134637 A1* | 5/2012 | Imamura | G02B 6/0365 | 385/127 |
| 2012/0230640 A1* | 9/2012 | Hayashi | G02B 6/02042 | 385/126 |
| 2013/0064543 A1* | 3/2013 | Imamura | G02B 6/02333 | 398/43 |
| 2013/0064554 A1* | 3/2013 | Li | G02B 6/02009 | 398/143 |
| 2013/0084077 A1* | 4/2013 | Mukasa | G02B 6/02333 | 398/142 |
| 2013/0183016 A1* | 7/2013 | Imamura | G02B 6/02042 | 385/127 |
| 2013/0209106 A1* | 8/2013 | Mukasa | H04B 10/2507 | 398/79 |
| 2013/0243381 A1* | 9/2013 | Hayashi | G02B 6/02266 | 385/124 |
| 2013/0251320 A1* | 9/2013 | Hayashi | G02B 6/02042 | 385/100 |
| 2013/0294728 A1* | 11/2013 | Rockwell | B23K 26/0604 | 385/39 |
| 2013/0302002 A1* | 11/2013 | Imamura | G02B 6/02042 | 385/127 |
| 2014/0010507 A1* | 1/2014 | Sasaki | G02B 6/02042 | 385/126 |
| 2014/0178024 A1* | 6/2014 | Takenaga | G02B 6/02042 | 385/126 |
| 2014/0226942 A1* | 8/2014 | Hayashi | G02B 6/02042 | 385/126 |
| 2015/0188634 A1* | 7/2015 | Imamura | G02B 6/02347 | 398/43 |
| 2016/0266307 A1* | 9/2016 | Hayashi | G02B 6/4413 | |
| 2017/0235043 A1* | 8/2017 | Amma | G02B 6/02014 | 385/126 |
| 2019/0162897 A1* | 5/2019 | Munige | G02B 6/03683 | |
| 2019/0346620 A1* | 11/2019 | Munige | G02B 6/02023 | |
| 2020/0056958 A1* | 2/2020 | Hasegawa | G01M 11/3109 | |
| 2020/0110217 A1* | 4/2020 | Bigot | G02B 6/0288 | |
| 2020/0257040 A1* | 8/2020 | Chen | G02B 6/42 | |
| 2020/0271857 A1* | 8/2020 | Bickham | G02B 6/0288 | |
| 2021/0003773 A1* | 1/2021 | Hayashi | G02B 6/028 | |
| 2021/0033781 A1* | 2/2021 | Malaviya | G02B 6/0281 | |
| 2021/0033782 A1* | 2/2021 | Pandey | G02B 6/0365 | |
| 2021/0157048 A1* | 5/2021 | Hebgen | G02B 6/03627 | |
| 2021/0294027 A1* | 9/2021 | Bennett | G02B 6/02019 | |
| 2021/0294029 A1* | 9/2021 | Bickham | G02B 6/0365 | |
| 2021/0356655 A1* | 11/2021 | Bennett | G02B 6/0281 | |
| 2021/0356661 A1* | 11/2021 | Bennett | C08F 22/14 | |
| 2021/0364690 A1* | 11/2021 | Mishra | G02B 6/03688 | |
| 2022/0026627 A1* | 1/2022 | Bickham | G02B 6/02395 | |
| 2022/0026628 A1* | 1/2022 | Bennett | G02B 6/0288 | |
| 2022/0026629 A1* | 1/2022 | Tandon | G02B 6/0286 | |
| 2022/0043201 A1* | 2/2022 | Bickham | G02B 6/02042 | |
| 2022/0066090 A1* | 3/2022 | Tandon | G02B 6/0365 | |
| 2022/0066091 A1* | 3/2022 | Hayashi | G02B 6/02066 | |
| 2022/0091328 A1* | 3/2022 | Zhang | G02B 6/03666 | |
| 2022/0113467 A1* | 4/2022 | Hayashi | G02B 6/02347 | |

(56) References Cited

U.S. PATENT DOCUMENTS

| | | | |
|---|---|---|---|
| 2022/0120962 A1* | 4/2022 | Hayashi | G02B 6/02004 |
| 2022/0120963 A1* | 4/2022 | Hayashi | G02B 6/02042 |
| 2022/0171122 A1* | 6/2022 | Chen | G02B 6/02128 |
| 2022/0196908 A1* | 6/2022 | Nagano | G02B 6/021 |
| 2022/0214496 A1* | 7/2022 | Sakamoto | G02B 6/02042 |
| 2022/0283362 A1* | 9/2022 | Bennett | G02B 6/02042 |
| 2022/0291445 A1* | 9/2022 | Li | C03B 37/014 |
| 2023/0119038 A1* | 4/2023 | Hayashi | G02B 6/4403 385/114 |
| 2023/0185017 A1* | 6/2023 | Hayashi | G02B 6/02042 385/126 |
| 2023/0204849 A1* | 6/2023 | Malviya | G02B 6/02009 385/126 |
| 2023/0314697 A1* | 10/2023 | Bickham | G02B 6/02042 385/126 |
| 2024/0045138 A1* | 2/2024 | Bickham | G02B 6/036 |
| 2024/0053531 A1* | 2/2024 | Tandon | G02B 6/02019 |
| 2024/0061167 A1* | 2/2024 | Bennett | G02B 6/02042 |
| 2024/0069271 A1* | 2/2024 | Tandon | G02B 6/03627 |

OTHER PUBLICATIONS

Bhaumik, Which Cut-off wavelength to be considered—Optical Fiber or Fiber Optic Cable?, 2017, Sterlite Tech 2017 (Year: 2017).*

* cited by examiner

FIG.1A

FIG.1B

TRENCH ASSISTED MULTI-CORE OPTICAL FIBER WITH REDUCED CROSSTALK

TECHNICAL FIELD

The present disclosure relates generally to optical fibers, and, more particularly, to a trench assisted multi-core optical fiber.

BACKGROUND

Multi-core optical fibers having a plurality of cores extending along the multi-core optical fibers, in a cladding are available as an optical transmission line which is capable to transmit information. Such multi-core optical fibers are required to reduce inter-core crosstalk. By reducing the inter-core crosstalk, it becomes easy to implement transmission of optical signals by use of a longer multi-core optical fiber. Moreover, the reduction of crosstalk allows reduction in core pitch between adjacent cores of the plurality of cores and thus allows a larger number of cores to be arranged in the cladding.

U.S. Pat. No. 8,406,595B2 discloses a multi-core optical fiber having plurality of cores where at least a pair of cores are of different types (i.e., some cores may have a different refractive index from rest of the other cores). However, the multi-core optical fiber of the U.S. Pat. No. 8,406,595B2 has a limitation in reduction of value of crosstalk.

Moreover, conventionally used multi-core optical fiber can attain low crosstalk when the relative refractive index difference of the cores with respect to the cladding is changed slightly between the adjacent cores, since a power transfer ratio between cores adjacent to each other can be made sufficiently low. However, there is a demand to further reduction in the inter-core crosstalk than in the multi-core optical fibers available in which the effective refractive indexes of the cores adjacent to each other are changed.

Thus, there is a need for a technical solution that overcomes the aforementioned problems of conventional multi-core optical fibers having higher crosstalk.

SUMMARY

In an aspect of the present disclosure, a multi-core optical fiber may have a plurality of cores extending parallelly along a central axis of the multi-core optical fiber. Each core of the plurality of cores is up-doped with an up-dopant. The multi-core optical fiber further has a plurality of buffer layers such that each buffer layer of the plurality of buffer layers envelop a corresponding core of the plurality of cores. Each buffer layer of the plurality of buffer layers has a predefined buffer layer thickness. The multi-core optical fiber further has a plurality of trench layers such that each trench layer of the plurality of trench layers envelops a corresponding buffer layer of the plurality of buffer layers. Each trench layer of the plurality of trench layers is down-doped with a down-dopant.

BRIEF DESCRIPTION OF DRAWINGS

The following detailed description of the preferred aspects of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred aspects of the present disclosure, and is not intended to represent the only form in which the present disclosure may be practiced. It is to be understood that the same or equivalent functions may be accomplished by different aspects that are intended to be encompassed within the spirit and scope of the present disclosure.

Figure 1A:
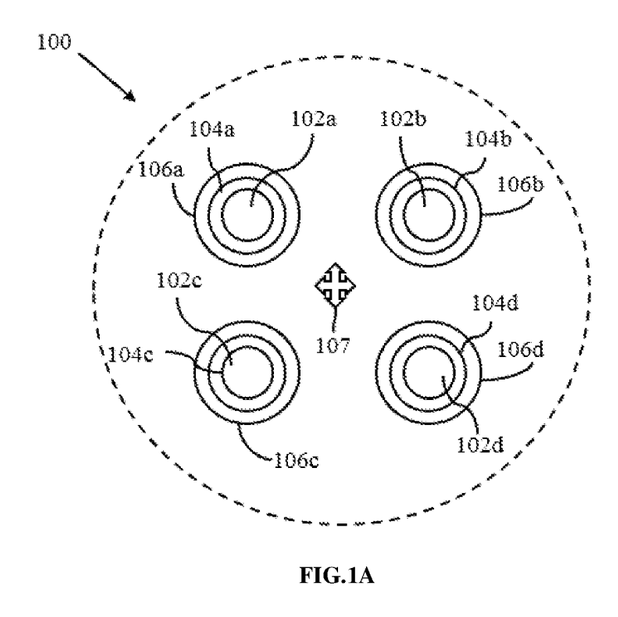
FIG. 1A illustrates a cross-sectional view of a multi-core optical fiber.

FIG. 1A illustrates a cross-sectional view of a multi-core optical fiber 100. The multi-core optical fiber 100 may have a plurality of cores 102 of which a first through fourth cores 102a, 102b, 102c and 102d are shown, a plurality of buffer layers 104 of which a first through fourth buffer layers 104a, 104b, 104c and 104d are shown, a plurality of trench layers 106 of which a first through fourth trench layers 106a, 106b, 106c and 106d are shown. The multi-core optical fiber 100 may have a central axis 107 such that the plurality of cores 102 may be arranged along the central axis 107 running longitudinally, i.e., generally parallel to the central axis 107. The multi-core optical fiber 100 may be designed to employ space division multiplexing (SDM) technique to transmit a plurality of optical signals through the plurality of cores 102 simultaneously. The multi-core optical fiber 100 may be manufactured by isotropically and/or anisotropically distributing the plurality of cores 102 in the same optical fiber (i.e., the multi-core optical fiber 100).

The plurality of cores 102 may be arranged in a predefined lattice on the cross-section of the multi-core optical fiber 100 that is perpendicular to an axis extending parallelly along the central axis 107 of the multi-core optical fiber 100. As illustrated in FIG. 1, the predefined lattice is a square lattice. Alternatively, the predefined lattice may be a hexagonal lattice. It will be apparent to a person skilled in the art that the plurality of cores 102 are shown to be arranged in the square lattice to make the illustrations concise and clear and should not be considered as a limitation of the present disclosure. In various alternate aspects, the plurality of cores 102 may be arranged in any type of the predefined lattice, without deviating from the scope of the present disclosure.

Further, each of the core (i.e., the first through fourth cores 102a, 102b, 102c and 102d) of the plurality of cores 102 may be configured to guide the optical signal. Each of the core of the plurality of cores 102 may be a cylindrical fiber that may run along a length of the multi-core optical fiber 100 and may be made up of a material selected from at least one of, a plastic, a pure silica glass, and the like. Preferably, each of the core of the plurality of cores 102 may be made up of a silica glass doped with a suitable up-dopant. In other words, each of the core of the plurality of cores 102 may be up-doped with one or more up-dopants which increase a refractive index of the silica glass. Suitable up-dopants may be selected from, but not limited to, Aluminum oxide ($Al_2O_3$), Phosphorus pentoxide ($P_2O_5$), Titanium dioxide ($TiO_2$), Chlorine (Cl), or the like. Specifically, as illustrated in FIG. 1, each of the core of the plurality of cores 102 may be up-doped with Germanium (Ge) to increase the refractive index of each of the core of the plurality of cores 102. Specifically, each of the core of the plurality of cores 102 may be up-doped with greater than or equal to 1 wt. % and less than or equal to 10 wt. % Ge.

The term "up-dopant," as used herein, refers to a dopant which raises the refractive index of the silica glass relative to pure, un-doped $SiO_2$. An up-dopant may be present in a region of an optical fiber having a negative relative refractive index when accompanied by one or more other dopants which are not up-dopants.

The plurality of buffer layers 104 (i.e., the first through fourth buffer layers 104a, 104b, 104c and 104d) may envelop the plurality of cores 102 (i.e., first through fourth cores 102a, 102b, 102c and 102d). Specifically, the plurality of buffer layers may have the first buffer layer 104a, the second buffer layer 104b, the third buffer layer 104c, and the fourth buffer layer 104d. Further, the first buffer layer 104a may be provided on an outer periphery of the first core 102a, the second buffer layer 104b may be provided on an outer periphery of the second core 102b, the third buffer layer 104c may be provided on an outer periphery of the third core 102c, the fourth buffer layer 104d may be provided on an outer periphery of the fourth core 102d. Further, the first through fourth buffer layers 104a, 104b, 104c and 104d may have a first through fourth buffer RRIs $\Delta_{b1}$-$\Delta_{b4}$. Specifically, the first buffer layer 10a may have a first buffer RRI $\Delta_{b1}$, the second buffer layer 104b may have a second buffer RRI $\Delta_{b2}$, the third buffer layer 104c may have a third buffer RRI $\Delta_{b3}$, and the fourth buffer layer 104d may have a fourth buffer RRI $\Delta_{b4}$. In one aspect, the first through fourth buffer RRIs $\Delta_{b1}$-$\Delta_{b4}$ may be equal. In another aspect, the first through fourth buffer RRIs $\Delta_{b1}$-$\Delta_{b4}$ may be different. Specifically, the first through fourth buffer RRIs $\Delta_{b1}$-$\Delta_{b4}$ of the first through fourth buffer layers 104a, 104b, 104c and 104d may be less than the first through fourth RRIs $\Delta_{c1}$ $\Delta_{c4}$ of the first through fourth cores 102a, 102b, 102c and 102d, respectively. Specifically, the first through fourth buffer RRIs $\Delta_{b1}$-$\Delta_{b4}$ of the first through fourth buffer layers 104a, 104b, 104c and 104d may be more than −0.25%.

The first through fourth buffer layers 104a, 104b, 104c and 104d may have a predefined buffer layer radius. The predefined buffer layer radius of each of the first through fourth buffer layers 104a, 104b, 104c and 104d may be in a range of 4 μm to 7 μm. In one aspect, the predefined buffer layer radius of each of the first through fourth buffer layers 104a, 104b, 104c and 104d may be equal. In another aspect, the predefined buffer layer thickness of each of the first through fourth buffer layers 104a, 104b, 104c and 104d may be different. The first through fourth buffer layers 104a, 104b, 104c and 104d may facilitate in providing a high effective area by increasing the MFD of the multi-core optical fiber 100. The MFD depends on the predefined buffer layer radius of the first through fourth buffer layers 104a, 104b, 104c and 104d such that the effective area and the MFD of the multi-core optical fiber 100 increases with an increase in the radius of the first through fourth buffer layers 104a, 104b, 104c and 104d. Further, the predefined radius of the first through fourth buffer layers 104a, 104b, 104c and 104d in the range of 4 μm to 7 μm may facilitate to increase a confinement of the optical signal, while having a higher value of the MFD, lower low crosstalk, and lower micro and macro bend. In one aspect, the MFD may be in a range of 8.7 μm to 9.5 μm.

It will be apparent to a person skilled in the art that the multi-core optical fiber 100 is shown to have four buffer layers (i.e., the first through fourth buffer layers 104a, 104b, 104c and 104d) to make the illustrations concise and clear and should not be considered as a limitation of the present disclosure. In various other aspects, the plurality of buffer layers 104 may have same number of buffer layers as the number of cores of the plurality of cores 102 such that each core of the plurality of cores 102 has at least one corresponding buffer layer of the plurality of buffer layers 104, without deviating from the scope of the present disclosure.

The first through fourth trench layers 106a, 106b, 106c and 106d may be provided such that the first trench layer 106a envelops an outer periphery of the first buffer layer 106a, the second trench layer 106b envelops an outer periphery of the second buffer layer 104b, the third trench layer 106c envelops an outer periphery of the third buffer layer 104c, and the fourth trench layer 106d envelops an outer periphery of the fourth buffer layer 104d. In one aspect, the first through fourth trench layers 106a, 106b, 106c and 106d may be provided between the corresponding first through fourth cores 102a102d and the cladding 108. The multicore optical fiber 100 has been designed for telecom applications. The multicore optical fiber 100 meets all the requirements of the fiber required for telecom applications. The optical fiber 100 has a core with diameter 102 of 8 μm to 9 μm as required by a fiber to be used in telecom applications. The optical fiber 100 has a cladding 108 with a diameter of 125+1 μm, a standard diameter required for telecom application. Further, the first through fourth trench layers 106a, 106b, 106c and 106d may have a first through fourth trench RRIs $\Delta_{t1}$-$\Delta_{t4}$. In an aspect, the first through fourth trench RRIs $\Delta_{t1}$-$\Delta_{t4}$ may be less than the first through fourth buffer RRIs $\Delta_{b1}$-$\Delta_{b4}$ of the first through fourth buffer layers 104a, 104b, 104c and 104d. Specifically, the first through fourth trench RRIs $\Delta_{t1}$-$\Delta_{t4}$ may be in a range of −0.1% to −0.25%. The MFD having a higher value may result into increase in crosstalk due to an overlap between neighbouring cores of the plurality of cores 102. Moreover, the macro and micro bend may be increased due to a lower distance between the plurality of cores 102 and a glass boundary. The first through fourth trench layers 106a, 106b, 106c and 106d having the first through fourth trench RRIs $\Delta_{t1}$-$\Delta_{t4}$ may be provided to control the crosstalk and the macro and micro bend of the multi-core optical fiber 100.

Specifically, the role of the first through fourth trench layers 106a, 106b, 106c and 106d is to suppress the optical signal traveling to the cladding 108 and to focus the optical signal on the first through fourth cores 102a, 102b, 102c and 102d to reduce the crosstalk between adjacent cores of the plurality of cores 102. Furthermore, the first through fourth trench layers 106a, 106b, 106c and 106d may facilitate in fabricating more densely arranged cores in the multi-core optical fiber 100. In one aspect, the first through fourth trench layers 106a, 106b, 106c and 106d may be made up of a material selected from at least one of, a plastic, a pure silica, glass and the like. Preferably, each of the first through fourth trench layers 106a, 106b, 106c and 106d may be made up of a silica glass doped with a suitable down-dopant. In other words, each of the first through fourth trench layers 106a, 106b, 106c and 106d may be down-doped with one or more down-dopants which may decrease a refractive index of the silica glass. The term "down-dopant," as used herein, is a dopant which has a propensity to lower the refractive index of the silica glass relative to pure, un-doped $SiO_2$. In one aspect, the first through fourth trench layers 106a, 106b, 106c and 106d may be down-doped with fluorine (F). It will be apparent to a person skilled in the art that the first through fourth trench layers 106a, 106b, 106c and 106d is shown to be down-doped with fluorine (F) to make the illustrations concise and clear and should not be considered as a limitation of the present disclosure. In various other aspects, the first through fourth trench layers 106a, 106b, 106c and 106d may be down-doped with any suitable down-dopant, without deviating from the scope of the present disclosure.

Further, each of the first through fourth trench layers 106a, 106b, 106c and 106d has an associated refractive index profile. As used herein the term "refractive index profile" is a relationship between refractive index or relative refractive index and multi-core optical fiber radius. The refractive index profile of each of the first through fourth trench layers 106a, 106b, 106c and 106d has a predefined trench alpha value. The predefined trench alpha value may be in a range of 7 to 10 such that the selected trench alpha value facilitates in providing a lower sensitivity to dispersion for the multi-core optical fiber 100. Further, the first through fourth trench layers 106a, 106b, 106c and 106d may have a trench radius that is in a range of 9 μm to 12 μm. Thus, the first through fourth trench layers 106a, 106b, 106c and 106d may have a trench diameter that is in a range of 18 μm to 24 μm. Specifically, the first trench layer 106a, the second trench layer 106b, the third trench layer 106c, and the fourth trench layer 106d has a first trench diameter, a second trench diameter, a third trench diameter, and a fourth trench diameter, respectively. In one aspect, numerical values of the first trench diameter, the second trench diameter, the third trench diameter, and the fourth trench diameter may be equal. In an alternative aspect, the numerical values of the first trench diameter, the second trench diameter, the third trench diameter, and the fourth trench diameter may be different.

It will be apparent to a person skilled in the art that the multi-core optical fiber 100 is shown to have four trench layers (i.e., the first through fourth trench layers 106a, 106b, 106c and 106d) to make the illustrations concise and clear and should not be considered as a limitation of the present disclosure. In various other aspects, the plurality of trench layers 106 may have same number of trench layers as the number of buffer layers of the plurality of buffer layers 104 such that each buffer layer of the plurality of buffer layers 104 has at least one corresponding trench layer of the plurality of trench layers 106, without deviating from the scope of the present disclosure.

Figure 1B:
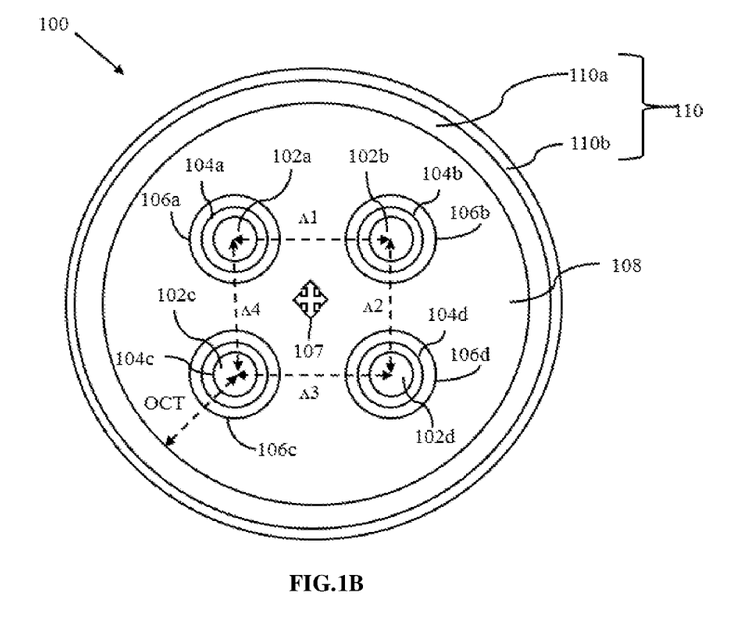
FIG. 1B illustrates another cross-sectional view of the multi-core optical fiber.

FIG. 1B illustrates another cross-sectional view of the multi-core optical fiber 100. The multi-core optical fiber 100 may have the first through fourth cores 102a, 102b, 102c and 102d, the first through fourth buffer layers 104a, 104b, 104c and 104d, the first through fourth trench layers 106a, 106b, 106c and 106d, a cladding layer 108, and a coating layer 110. The multi-core optical fiber 100 may have the central axis 107 such that the plurality of cores 102 may be arranged along the central axis 107 running longitudinally, i.e., generally parallel to the central axis 107.

The plurality of cores 102 may be arranged in the predefined lattice on the cross-section of the multi-core optical fiber 100 that is perpendicular to the axis extending parallelly along the central axis 107 of the multi-core optical fiber 100. As illustrated in FIG. 1B, the predefined lattice is the square lattice. The first through fourth cores 102a, 102b, 102c and 102d may be made up of a silica glass doped with a suitable up-dopant. In other words, the first through fourth cores 102a, 102b, 102c and 102d may be up-doped with one or more up-dopants which increase a refractive index of the silica glass. Suitable up-dopants may be selected from, but not limited to, Aluminum oxide ($Al_2O_3$), Phosphorus pentoxide ($P_2O_5$), Titanium dioxide ($TiO_2$), Chlorine (Cl), or the like. Specifically, as illustrated in FIG. 1, each of the core of the plurality of cores 102 may be up-doped with Germanium (Ge) to increase the refractive index of each of the first through fourth cores 102a, 102b, 102c and 102d. Specifically, each of the first through fourth cores 102a, 102b, 102c and 102d may be up-doped with greater than or equal to 1 wt. % and less than or equal to 10 wt. % Ge.

The term "up-dopant," as used herein, refers to a dopant which raises the refractive index of the silica glass relative to pure, un-doped $SiO_2$. An up-dopant may be present in a region of an optical fiber having a negative relative refractive index when accompanied by one or more other dopants which are not up-dopants.

Further, the first through fourth cores 102a, 102b, 102c and 102d has an associated refractive index profile. As used herein, the "refractive index profile" is a relationship between a refractive index or a relative refractive index and optical fiber radius of the multi-core optical fiber 100. The refractive index profile of each of the first through fourth cores 102a, 102b, 102c and 102d has a predefined core alpha value. Specifically, the core alpha value has significant impact on how the optical signal distributes inside each of the first through fourth cores 102a, 102b, 102c and 102d and thus effects an effective refractive index of a guiding mode in the multi-core optical fiber 100. Moreover, the core alpha value has significant impact on dispersion and a mode field diameter (MFD). When a mode distribution penetrates more inside the cladding 108, then an integral overlap between modes increases which in turn increases crosstalk. Specifically, very low core alpha value leads to a low effective index of mode (i.e., poor confinement of the mode) and very high core alpha value (i.e., a step index profile) is not possible to manufacture. Therefore, the predefined core alpha value is selected in a range of 5 to 9 such that the selected core alpha value facilitates is providing a lower sensitivity to dispersion for the multi-core optical fiber 100.

As illustrated in FIG. 1B, each of the first through fourth cores 102a, 102b, 102c and 102d has a circular shape. It will be apparent to a person skilled in the art that the first through fourth core 102a, 102b, 102c and 102d are shown to have the circular shape to make the illustrations concise and clear and should not be considered as a limitation of the present disclosure. In various other aspects, the first through fourth core 102a, 102b, 102c and 102d may have any type of shape such as, but not limited to, an oval shape, a hexagonal shape, a triangular shape, an irregular shape, and the like without deviating from the scope of the present disclosure.

Further, the first through fourth core 102a, 102b, 102c and 102d may have a core radius that is in a range of 3.5 micrometers (μm) to 5 μm. Thus, the first through fourth core 102a, 102b, 102c and 102d may have a core diameter that is in a range of 7 μm to 10 μm. Specifically, the first core 102a, the second core 102b, the third core 102c, and the fourth core 102d has the first core diameter, the second core diameter, the third core diameter, and the fourth core diameter, respectively. In one aspect, numerical values of the first core diameter, the second core diameter, the third core diameter, and the fourth core diameter may be equal. In an alternative aspect, the numerical values of the first core diameter, the second core diameter, the third core diameter, and the fourth core diameter may be different.

Further, as illustrated in FIG. 1B, each pair of the cores of the first through fourth cores 102a, 102b, 102c and 102d has a predefined core pitch that define a distance between two corresponding cores of the first through fourth cores 102a, 102b, 102c and 102d. The predefined core pitch may be in a range of 35 μm to 45 μm. For example, the first core 102a and the adjacent second core 102b may have a first core pitch $_A1$, the second core 102a and the adjacent third core 102b may have a second core pitch $_A2$, the third core 102c and the adjacent fourth core 102d may have a third core pitch $_A3$, and the fourth core 102d and the adjacent first core 102a may have a fourth core pitch $_\Lambda 4$. Specifically, numerical values of the first through fourth core pitch $_\Lambda 1$-$_\Lambda 4$ may be in the range of 35 μm to 45 μm. In one aspect, the numerical values of the first through fourth core pitch $_\Lambda 1$-$_\Lambda 4$ may be equal. In an alternative aspect, the numerical value of the first through fourth core pitch $_\Lambda 1$-$_\Lambda 4$ may be different.

It will be apparent to a person skilled in the art that the multi-core optical fiber 100 is shown to have four cores (i.e., the first through fourth cores 102a, 102b, 102c and 102d) to make the illustrations concise and clear and should not be considered as a limitation of the present disclosure. In various other aspects, the multi-core optical fiber 100 may have more than four cores, without deviating from the scope of the present disclosure. Specifically, the multi-core optical fiber 100 may have an even number of cores. In other words, the multi-core optical fiber 100 may have fibers having a numerical count that is in multiple of two.

Further, the first through fourth cores 102a, 102b, 102c and 102d may have a first through fourth core relative refractive indexes (RRIs) $\Delta_{c1}$-$\Delta_{c4}$. Specifically, the first core 102a may have a first core RRI $\Delta_{c1}$, the second core 102a may have a second core RRI $\Delta_{c2}$, the third core 102c may have a third core RRI $\Delta_{c3}$, and the fourth core 102d may have a fourth core RRI $\Delta_{c4}$. In one aspect, the first through fourth core RRIs $\Delta_{c1}$-$\Delta_{c4}$ may be equal. In another aspect, the first through fourth core RRIs $\Delta_{c1}$-$\Delta_{c4}$ may be different. Specifically, the first through fourth core RRIs $\Delta_{c1}$-$\Delta_{c4}$ may be in a range of 0.3% to 0.45%.

The first through fourth buffer layers 104a, 104b, 104c and 104d may envelop the plurality of cores 102 (i.e., the first through fourth cores 102a, 102b, 102c and 102d). The first buffer layer 104a may be provided on the outer periphery of the first core 102a, the second buffer layer 104b may be provided on the outer periphery of the second core 102b, the third buffer layer 104c may be provided on the outer periphery of the third core 102c, the fourth buffer layer 104d may be provided on the outer periphery of the fourth core 102d. Further, the first through fourth buffer layers 104a, 104b, 104c and 104d may have a first through fourth buffer RRIs $\Delta_{b1}$-$\Delta_{b4}$. Specifically, the first buffer layer 10a may have a first buffer RRI $\Delta_{b1}$, the second buffer layer 104b may have a second buffer RRI $\Delta_{b2}$, the third buffer layer 104c may have a third buffer RRI $\Delta_{b3}$, and the fourth buffer layer 104d may have a fourth buffer RRI $\Delta_{b4}$. In one aspect, the first through fourth buffer RRIs $\Delta_{b1}$-$\Delta_{b1}$ may be equal. In another aspect, the first through fourth buffer RRIs $\Delta_{b1}$-$\Delta_{b4}$ may be different. Specifically, the first through fourth buffer RRIs $\Delta_{b1}$-$\Delta_{b4}$ of the first through fourth buffer layers 104a, 104b, 104c and 104d may be less than the first through fourth RRIs $\Delta_{c1}$-$\Delta_{c4}$ of the first through fourth cores 102a, 102b, 102c and 102d, respectively. Specifically, the first through fourth buffer RRIs $\Delta_{b1}$-$\Delta_{b4}$ of the first through fourth buffer layers 104a, 104b, 104c and 104d may be more than −0.25%.

The first through fourth buffer layers 104a, 104b, 104c and 104d may have a predefined buffer layer radius. The predefined buffer layer radius of each of the first through fourth buffer layers 104a, 104b, 104c and 104d may be in a range of 4 μm to 7 μm. In one aspect, the predefined buffer layer radius of each of the first through fourth buffer layers 104a, 104b, 104c and 104d may be equal. In another aspect, the predefined buffer layer radius of each of the first through fourth buffer layers 104a, 104b, 104c and 104d may be different. The first through fourth buffer layers 104a, 104b, 104c and 104d may facilitate in providing a high effective area by increasing the MFD of the multi-core optical fiber 100. The MFD depends on the predefined buffer layer radius of the first through fourth buffer layers 104a, 104b, 104c and 104d such that the effective area and the MFD of the multi-core optical fiber 100 increases with increase in the predefined radius of the first through fourth buffer layers 104a, 104b, 104c and 104d. Further, the predefined radius of the first through fourth buffer layers 104a, 104b, 104c and 104d in the range of 4 μm to 7 μm may facilitate to increase a confinement of the optical signal, while having a higher value of the MFD, lower low crosstalk, and lower micro and macro bend. In one aspect, the MFD may be in a range of 8.7 μm to 9.5 μm.

It will be apparent to a person skilled in the art that the multi-core optical fiber 100 is shown to have four buffer layers (i.e., the first through fourth buffer layers 104a, 104b, 104c and 104d) to make the illustrations concise and clear and should not be considered as a limitation of the present disclosure. In various other aspects, the plurality of buffer layers 104 may have same number of buffer layers as the number of cores of the plurality of cores 102 such that each core of the plurality of cores 102 has at least one corresponding buffer layer of the plurality of buffer layers 104, without deviating from the scope of the present disclosure.

The first through fourth trench layers 106a, 106b, 106c and 106d may be provided such that the first trench layer 106a envelops the outer periphery of the first buffer layer 104a, the second trench layer 106b envelops the outer periphery of the second buffer layer 104b, the third trench layer 106c envelops the outer periphery of the third buffer layer 104c, and the fourth trench layer 106d envelops the outer periphery of the fourth buffer layer 104d. In one aspect, the first through fourth trench layers 106a, 106b, 106c and 106d may be provided between the corresponding first through fourth cores 102a102d and the cladding 108. Further, the first through fourth trench layers 106a, 106b, 106c and 106d may have a first through fourth trench RRIs $\Delta_{t1}$-$\Delta_{t4}$. In an aspect, the first through fourth trench RRIs $\Delta_{t1}$-$\Delta_{t4}$ may be less than the first through fourth buffer RRIs $\Delta_{b1}$-$\Delta_{b4}$ of the first through fourth buffer layers 104a, 104b, 104c and 104d. Specifically, the first through fourth trench RRIs $\Delta_{t1}$-$\Delta_{t4}$ may be in a range of −0.1% to −0.25%. The MFD having a higher value may result into increase in crosstalk due to an overlap between neighbouring cores of the plurality of cores 102. Moreover, the macro and micro bend may be increased due to a lower distance between the plurality of cores 102 and a glass boundary. The first through fourth trench layers 106a, 106b, 106c and 106d having the first through fourth trench RRIs $\Delta_{t1}$-$\Delta_{t4}$ may be provided to control the crosstalk and the macro and micro bend of the multi-core optical fiber 100.

Specifically, the role of the first through fourth trench layers 106a, 106b, 106c and 106d is to suppress the optical signal traveling to the cladding 108 and to focus the optical signal on the first through fourth cores 102a, 102b, 102c and 102d to reduce the crosstalk between adjacent cores of the plurality of cores 102. Furthermore, the first through fourth trench layers 106a, 106b, 106c and 106d may facilitate in fabricating more densely arranged cores in the multi-core optical fiber 100. In one aspect, the first through fourth trench layers 106a, 106b, 106c and 106d may be made up of a material selected from at least one of, a plastic, a pure silica glass, and the like. Preferably, each of the first through fourth trench layers 106a, 106b, 106c and 106d may be made up of a silica glass doped with a suitable down-dopant. In other words, each of the first through fourth trench layers 106a, 106b, 106c and 106d may be down-doped with one or more down-dopants which may decrease a refractive index of the silica glass. The term "down-dopant," as used herein, is a dopant which has a propensity to lower the refractive index of the silica glass relative to pure, un-doped $SiO_2$. In one aspect, the first through fourth trench layers 106a, 106b, 106c and 106d may be down-doped with fluorine (F). It will be apparent to a person skilled in the art that the first through fourth trench layers 106a, 106b, 106c and 106d is shown to be down-doped with fluorine (F) to make the illustrations concise and clear and should not be considered as a limitation of the present disclosure. In various other aspects, the first through fourth trench layers 106a, 106b, 106c and 106d may be down-doped with any suitable down-dopant, without deviating from the scope of the present disclosure.

Further, each of the first through fourth trench layers 106a, 106b, 106c and 106d has an associated refractive index profile. The refractive index profile of each of the first through fourth trench layers 106a, 106b, 106c and 106d has a predefined trench alpha value. The predefined trench alpha value may be in a range from about 7 to about 10 such that the selected trench alpha value facilitates is providing a lower sensitivity to dispersion for the multi-core optical fiber 100. Further, the first through fourth trench layers 106a, 106b, 106c and 106d may have a trench radius that is in a range from about 9 μm to about 12 μm. Thus, the first through fourth trench layers 106a, 106b, 106c and 106d may have a trench diameter that is in a range from about 18 μm to about 24 μm. Specifically, the first trench layer 106a, the second trench layer 106b, the third trench layer 106c, and the fourth trench layer 106d has a first trench diameter, a second trench diameter, a third trench diameter, and a fourth trench diameter, respectively. In one aspect, numerical values of the first trench diameter, the second trench diameter, the third trench diameter, and the fourth trench diameter may be equal. In an alternative aspect, the numerical values of the first trench diameter, the second trench diameter, the third trench diameter, and the fourth trench diameter may be different.

It will be apparent to a person skilled in the art that the multi-core optical fiber 100 is shown to have four trench layers (i.e., the first through fourth trench layers 106a, 106b, 106c and 106d) to make the illustrations concise and clear and should not be considered as a limitation of the present disclosure. In various other aspects, the plurality of trench layers 106 may have same number of trench layers as the number of buffer layers of the plurality of buffer layers 104 such that each buffer layer of the plurality of buffer layers 104 has at least one corresponding trench layer of the plurality of trench layers 106, without deviating from the scope of the present disclosure.

In some aspects of the present disclosure, each buffer layer of the plurality of buffer layers 104a, 104b, 104c and 104d may have traces of an up-dopant and a down-dopant. In other words, each buffer layer of the plurality of buffer layers 104a, 104b, 104c and 104d may have traces of the up-dopant diffused through corresponding edges of each corresponding core of the plurality of cores 102a, 102b, 102c and 102d. Further, each buffer layer of the plurality of buffer layers 104a, 104b, 104c and 104d may have traces of the down-dopant diffused through corresponding edges of each corresponding trench layer of the plurality of trench layers 106a, 106b, 106c and 106d.

Further, the multi-core optical fiber 100 have the cladding 108 that may envelop an outer circumferential surface of the plurality of trench layers 106 (i.e., the first through fourth trench layers 106a, 106b, 106c and 106d). The cladding 108 may be made up of a material selected from at least one of, a plastic, a glass, and the like. The cladding 108 may have an associated outer cladding thickness OCT that may behave a predefined value depending on particular application attributes. In an example, the OCT may be defined as a distance from the centre of any of the core of the plurality of cores 102 to an interface of the cladding 108 with the coating 110. The cladding 108 may have an associated refractive index that may be greater than the refractive index of each of the core of the plurality of cores 102. In an example, when the refractive index of each of the core of the plurality of cores 102 is n1 and the refractive index of the cladding 108 is n2, then n2 is greater than n1.

The multi-core optical fiber 100 further has the coating layer 110. The coating layer 110 may have one or more coatings of which a primary coating 110a and a secondary coating 110b are shown. It will be apparent to a person skilled in the art that the coating layer 110 is shown to have the primary coating 110a and the secondary coating 110b to make the illustrations concise and clear and should not be considered as a limitation of the present disclosure. In various other aspects, the coating layer 110 may have any number of layers similar to the primary layer 110a and/or the secondary layer 110b without deviating from the scope of the present disclosure. In an aspect, the primary coating 110a may be made up of an ultraviolet (UV) light curable resin which is formed of, for example, a first colored material. In another aspect, the primary coating 110a and the secondary coating 110b may have the UV light curable acrylate mixture of monomers, oligomers, photo initiators, and additives, such that the mixtures are cured separately.

In one aspect of the present disclosure, the first through fourth core 102a, 102b, 102c and 102d, the relative refractive index is between 0.3-0.45%, the radius is between 3.5-5 μm, and the core alpha is between 5-9. Correspondingly, the first through fourth trench layers 106a, 106b, 106c and 106d, the relative refractive index is between −0.1-0.25%, the radius is between 9-12 μm, and the alpha is between to 7-10. In relation to the above aspects of the disclosure, the core pitch is between 35-45 microns. The above aspects of the disclosure may have a buffer region. In case the above aspects of the disclosure have buffer region, the buffer radius is in between 4-7 microns. The multi-core optical fiber 100 fabricated based on the above numerical values may have an inter-core crosstalk less than −30 decibel/kilometre (dB/km), the MFD at a wavelength of 1550 nanometres (nm) between 8.7-9.5 μm, and the cable cut-off is less than 1260 nm. For example, a multicore fiber with core relative refractive index of 0.4%, core radius of 4.5 μm and core alpha of 8 with trench relative refractive index of −0.17%, trench radius of 9.55 μm, and trench alpha of 8, having no buffer region and having a core pitch equal to 40, may have an inter-core crosstalk equal to −45 decibel/kilometre (dB/km), MFD at a wavelength of 1550 nm is 8.71 μm, and the cable cut-off is 1110 nm. In another example, a multicore fiber with a buffer region defined by a buffer radius of 5.25 microns and having a pitch of 40 microns, may have a core relative refractive index of 0.35%, core radius of 3.5 μm, core alpha of 6, trench relative refractive index of 0.24%, trench radius of 11.25 μm and trench alpha of 7. Such a multicore fiber may demonstrate an inter-core crosstalk equal to −32 decibel/kilometre (dB/km), MFD at a wavelength of 1550 nanometres (nm) is 8.9 μm, and the cable cut-off is 950 nm.

Thus, the multi-core optical fiber 100 of the present disclosure may reduce an effective area by increasing the MFD of the multi-core optical fiber 100.

Further, the plurality of trench layers 106 having high relative refractive index are provided that facilitate in controlling the inter-core crosstalk, macro and micro bend.

Furthermore, the plurality of buffer layers 104 may be provided with minimal thickness that may increase the confinement of the optical signal and while having a higher value of the MFD. As the minimal thickness of the plurality of buffer layers 104 moves the plurality of buffer layers 104 near to the plurality of cores 102, the inter-core crosstalk reduces and provides a lower micro and macro bend.

While various aspects of the present disclosure have been illustrated and described, it will be clear that the present disclosure is not limited to these aspects only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A multi-core optical fiber, comprising:
   a plurality of cores extending parallelly along a central axis of the multicore optical fiber, wherein each core of the plurality of cores is up-doped with an up-dopant, wherein each core of the plurality of cores has an associated core relative refractive index RRI, wherein the core RRI of the plurality of cores is equal;
   a plurality of buffer layers, wherein each buffer layer of the plurality of buffer layers envelops a corresponding core of the plurality of cores; and
   a plurality of trench layers, wherein each trench layer of the plurality of trench layers envelops a corresponding buffer layer of the plurality of buffer layers,
   wherein each trench layer of the plurality of trench layers is down-doped with a down-dopant
   wherein each trench layer of the plurality of trench layers has a trench relative refractive index (RRI) in a range of −0.1% to −0.25%, wherein the multicore optical fiber has a cable cut-off of less than or equal to 1260 nm.

2. The multi-core optical fiber of claim 1, wherein the plurality of cores is an even number of cores.

3. The multi-core optical fiber of claim 1, wherein each buffer layer of the plurality of buffer layers has a predefined buffer layer radius in a range of 4 micrometers (μm) to 7 μm.

4. The multi-core optical fiber of claim 1, wherein a core pitch between a pair of adjacent cores of the plurality of cores is in a range of 35 μm to 45 μm.

5. The multi-core optical fiber of claim 1, wherein each buffer layer of the plurality of buffer layers and each trench layer of the plurality of trench layers has an associated a buffer RRI and a trench RRI, respectively, wherein the core RRI is greater than the buffer RRI and the buffer RRI is greater than the trench RRI.

6. The multi-core optical fiber of claim 1, further comprising a cladding and a coating such that the cladding envelopes each trench layer of the plurality of trench layers and the coating envelops the cladding.

7. The multi-core optical fiber of claim 1, wherein each core of the plurality of cores has a shape selected from at least one of, a circular shape, an oval shape, a hexagonal shape, and a triangular shape.

8. The multi-core optical fiber of claim 1, wherein each buffer layer of the plurality of buffer layers has traces of an up-dopant and a down-dopant, wherein the up-dopant is associated with the plurality of cores and the down-dopant is associated with the plurality of trench layers.

9. The multi-core optical fiber of claim 1, wherein the up-dopant is germanium and the down-dopant is fluorine.

10. The multi-core optical fiber of claim 1, wherein an inter-core crosstalk between the plurality of cores at a wavelength of 1550 nanometres (nm) is less than −30 decibel/kilometres (dB/km).

* * * * *